United States Patent [19]

Vick

[11] Patent Number: 4,458,718
[45] Date of Patent: Jul. 10, 1984

[54] SPOOL VALVE AND SEAL HAVING ZERO LEAKAGE

[75] Inventor: Ralph L. Vick, Granada Hills, Calif.

[73] Assignee: The Bendix Corporation, Southfield, Mich.

[21] Appl. No.: 531,100

[22] Filed: Sep. 12, 1983

Related U.S. Application Data

[63] Continuation of Ser. No. 298,855, Sep. 3, 1981, abandoned.

[51] Int. Cl.³ .............................................. F16K 31/12
[52] U.S. Cl. .................................. 137/505; 137/505.18; 137/625.3; 137/625.35; 137/625.68; 251/325
[58] Field of Search .............. 137/505, 505.18, 505.42, 137/505.37, 625.3, 625.28, 625.34, 625.35, 625.39, 625.68; 251/127, 210, 325, DIG. 1; 277/198

[56] References Cited

U.S. PATENT DOCUMENTS

| | | | |
|---|---|---|---|
| Re. 24,440 | 3/1958 | Groen | 277/198 UX |
| 2,621,050 | 12/1952 | Campbell | 137/625.68 |
| 2,836,198 | 5/1958 | McNeill | 137/625.39 |
| 2,979,080 | 4/1961 | Hewitt | 137/625.68 |
| 3,076,476 | 2/1963 | Campbell | 137/625.68 X |
| 3,978,891 | 9/1976 | Vick | 137/501 X |
| 4,083,380 | 4/1978 | Huber | 137/625.38 X |

FOREIGN PATENT DOCUMENTS 17041 of 1891 United Kingdom ........... 137/625.38

Primary Examiner—Harold W. Weakley
Attorney, Agent, or Firm—Robert C. Smith; W. F. Thornton

[57] ABSTRACT

A spool valve and seal having zero leakage includes a spool valve member having a hollow interior translatable within a bore in a valve body with inlet pressure connected through ports to the hollow interior of the spool valve member. A series of radial orifices axially displaced from the inlet ports communicate the interior with the exterior surface of said spool valve member, the outlets of said orifices terminating in chamfered edges. A seal is positioned adjacent the spool valve member in an annular groove formed in the surface of the bore within which the spool member is translated, the seal being positioned to prevent leakage between the inlet pressure passages and an outlet chamber in said valve body. The preferable seal for this purpose consists of a rubber O-ring in the groove with a Teflon sealing ring overlying the O-ring adjacent the surface of the spool member such that high fluid pressure on the inside of the spool member which is communicated through said orifices to the surface of the sealing ring forces the sealing ring and O-ring into the groove so that when the orifice edges pass the sealing ring they do not abrade the surface of the sealing ring. To avoid having the seal involved in the metering function of the valve, the maximum diameter of the chamfered edges is less than the length of the bore between the seal groove edge nearest the outlet chamber and the outlet chamber in said valve body.

5 Claims, 4 Drawing Figures

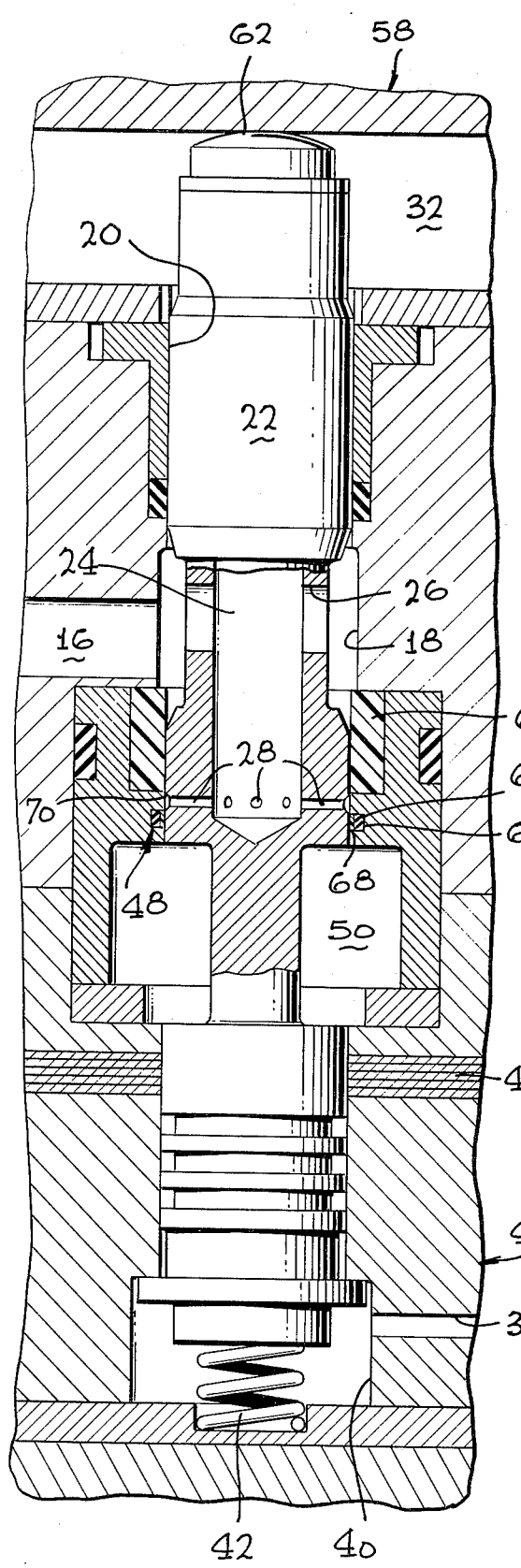
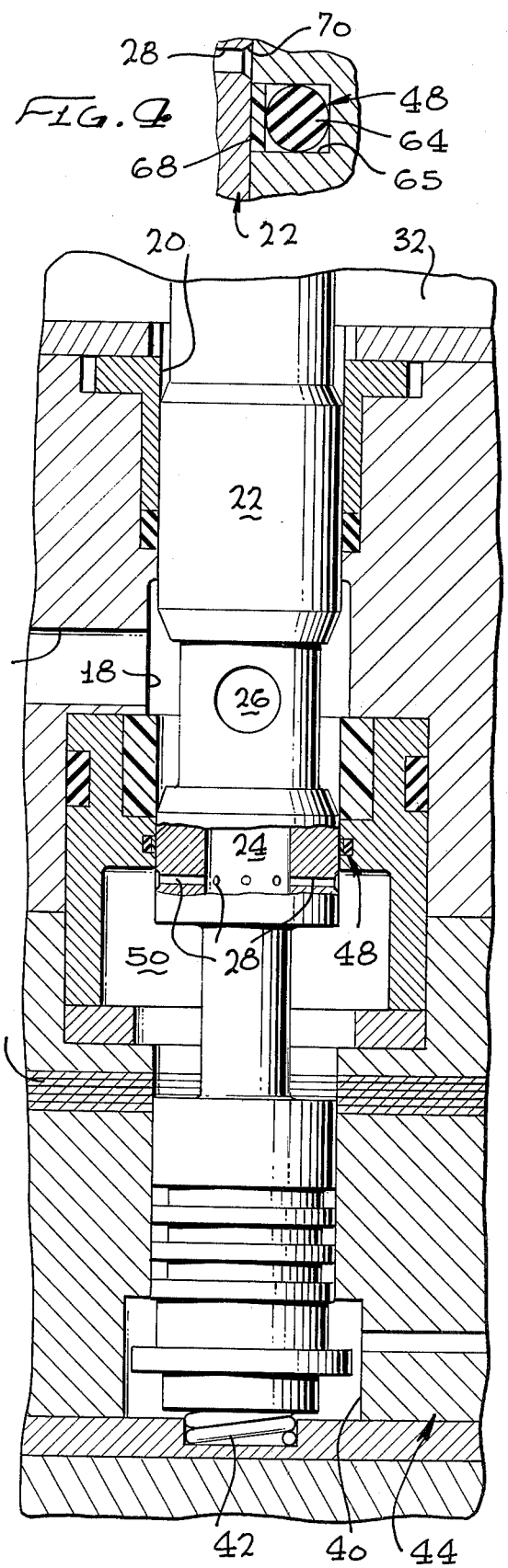
FIG. 2
FIG. 3

SPOOL VALVE AND SEAL HAVING ZERO LEAKAGE

This is a continuation of application Ser. No. 298,855, filed Sept. 3, 1981, now abandoned.

This invention relates to a spool valve and seal therefor.

There have been many designs of spool valves having some arrangement of packing or flexible sealing means to prevent leakage. Rubber O-rings have often been used to provide the packing for such seals, and these have been quite effective so long as they remain intact. A frequent problem is that the fluid pressure tends to force the O-ring out of its groove and into the limited space between a spool or land and the bore within which it moves. This may result in pinching and resulting deterioration of the O-ring. Another problem area is presented by designs in which a metering orifice tends to contact or cross the O-ring. In such case the O-ring is often blown or urged into a metering orifice, causing the O-ring material to be abraded away by the edges of the orifice.

To deal with the above problems, O-rings have frequently been combined with sealing rings of low friction material such as polytetrafluoroethylene (Teflon or Turcon) which are positioned adjacent the moving surface and which are shaped to restrain the O-ring from migrating out of its groove. Such a sealing arrangement is shown in U.S. Pat. No. Re. 24,440 to Groen. In some instances it has been found that because of the pressure differentials and the valve construction, the sealing ring itself has been subjected to pressure tending to force it into the metering orifices and causing it to be abraded or "nibbled" away.

It is therefore an object of the present invention to provide a spool valve having zero leakage including sealing means which is durable and which will withstand thousands of operating cycles even with substantial pressure differentials.

It is a specific object of the present invention to provide a valve and sealing means meeting the above object in which the operating fluid pressures tend to prevent abrading and deterioration of the seal structure.

It is a further object of the present invention to provide a valve and sealing means therefor which meets the above objectives and wherein the seal itself is prevented from being involved in metering where there is a significant metering opening.

It is a further object to provide a valve and sealing means therefor which meets the above objectives and which is not significantly more complicated or expensive than other designs presently in use.

These and other objects will become apparent from the following description taken in connection with the accompanying drawings, in which:

FIG. 2 is an enlarged view of a portion of the seal structure shown in the valve of FIG. 1;

FIG. 3 is an enlarged view of the spool member shown in the valve of FIG. 1 with the spool member displaced to a different position; and FIG. 4 is a substantially enlarged view of the sealing means and metering orifice shown in FIGS. 1, 2 and 3.

Figure 1:
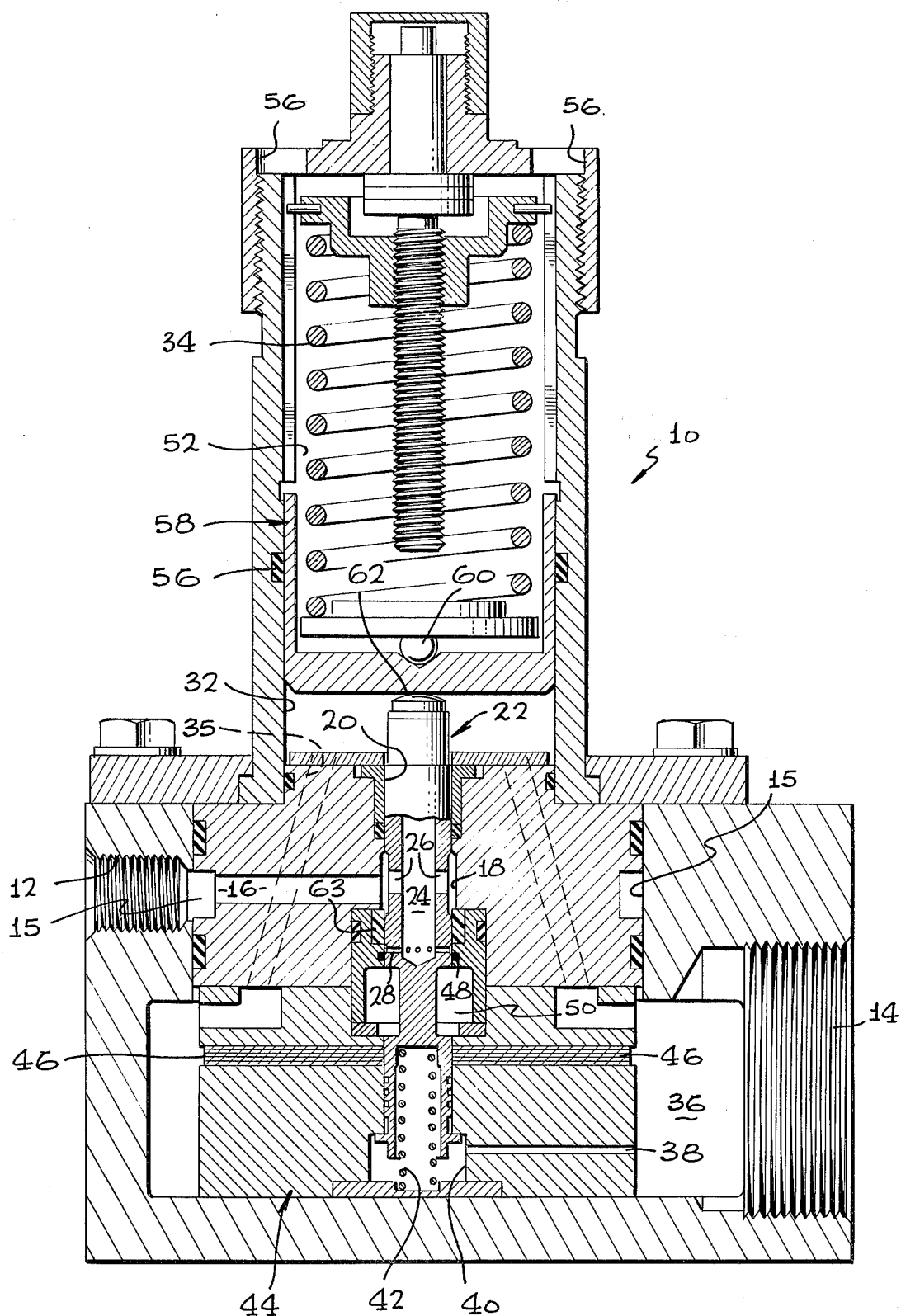
FIG. 1 is a sectional view of a spool valve incorporating my invention.

Referring now to FIG. 1, a high pressure pressure reducing valve (which could be for controlling either gas or liquids) is shown generally at numeral 10 having an inlet port 12 and an outlet port 14 in a housing 11. Inlet port 12 leads to an annulus 15 connected to one of a plurality of inlet passages 16 in a block 17 (only one of which is shown) communicating with an annulus 18 which becomes an expanded portion of a bore 20 containing a spool valve member 22. Spool valve member 22 includes an internal chamber 24 which communicates with the annulus 18 through a plurality of ports 26. Spool valve member 22 also carries a plurality of small radially directed metering orifices 28 which, as shown, are all blocked against the sides of bore 20. As shown, spool valve member 22 is closed in its most upward position and is capable of moving downwardly under the force of spring 34 as opposed by the gas pressure in a chamber 32. Chamber 32 is connected via elongated passageways 35 (two of several shown in dotted outline) to an outlet annulus 36 adjacent outlet port 14. Also connected to annulus 36 is a passageway 38 communicating with a chamber 40 adjacent the lower end of the spool valve member 22. It will be observed that chamber 40 includes a spring 42 which acts in opposition to the force of spring 34 but which is smaller and exerts a lighter force than spring 34. Passageway 38 is located in a guide block member 44 which also serves as part of the bore within which spool valve member 22 is translated. Immediately above block 44 is a plurality of stacked disks or washer-like elements 46, which stack contains a plurality of openings and orifices which cooperate to define a number of finely divided serpentine paths which serve to quiet the operation of the valve. Housing 11, block 17, block 44 and disks 46 constitute a valve body to which an upper housing member 47 is attached. Details of a disk stack suitable for this application are shown in U.S. Pat. No. 3,978,891 filed in the name of Ralph L. Vick, the inventor herein (common assignee). As the spool valve member 22 moves downwardly, the small radial orifices 28 cross a seal 48, an additional length of bore 20, and open into an annular chamber 50. See FIGS. 2 and 3. The corresponding downward movement of the spool valve member 22 will open communication between the chamber 50 and the internal edges of the disk stack 46, thereby permitting fluid under pressure to flow radially through the stack 46 and into the outlet annulus 36 and outlet port 14.

The upper housing member 47 contains a chamber 52 which contains spring 34 and which is open to the atmosphere through a plurality of ports 54. This chamber is separated from the lower chamber 32 by means of a piston 58 and a seal 56. Piston 58 contacts the upper part of spool valve member 22 and is moved under the resultant of the forces of spring 34 and the variable pressure in chamber 32 to control the position of spool valve member 22. It will be noted that the bottom retainer of spring 34 cooperates with piston 58 to retain a ball 60 positioned directly over spool valve member 22 for the purpose of assuring that the force exerted through piston 58 is applied directly to the highest point on the curved surface 62 on the end of spool valve member 22. This structure avoids any laterally directed forces which might tend to cause either piston 58 or spool valve member 22 to hang up in their respective bores.

FIGS. 2 and 3 are enlarged views of the area of FIG. 1 including valve member 22 with FIG. 2 showing member 22 in a closed position and FIG. 3 showing member 22 in an open position. These views show a portion of the spool valve member 22, the small metering orifices 28, a portion of an inlet passage 16, inlet annulus 18, a ring-shaped insert 63 of polytetrafluorethylene material (Teflon) to reduce friction between bore 20 and spool valve member 22, chamber 50, and the seal 48. Seal structure 48 is further enlarged in FIG. 4 and includes an O-ring 64 of rubber or other elastomeric material contained in a groove 66 formed in bore 20, said O-ring backing a sealing ring 68 of low friction material such as Teflon or Turcon. Since the fluid pressure across valve 10 may be quite high, such as the order of 4500 psi, the pressure acting through orifices 28 against sealing ring 68 is also very high. With the construction shown, this pressure tends to force the sealing ring 68 and the O-ring 64 back into groove 66 and away from the edges of orifices 28. In this view it will be observed that a chamfer 70 is formed on the outside surface of spool valve member 22 at the outlet of orifice 28. All orifices 28 have such a chamfer. The chamfer is preferably sized such that its maximum diameter is less than the axial length of sealing ring 68. To keep seal 48 from being significantly involved in the metering function of the valve, it is preferable also that the maximum diameter of the chamfer be less than the length of the bore 20 between the edge of seal groove 66 nearest chamber 50 and the annular chamber 50.

The valve 10 is a high pressure gas reducing valve of a type which operates to maintain a desired, fairly low, outlet pressure despite having a quite high inlet pressure such as approximately 4500 psi. In the views shown in FIGS. 1 and 2, the inlet passages are blocked and the outlet pressure in annulus 36 communicated through passageways 35 to chamber 32 is sufficiently high that it is capable of opposing the force of spring 34 thereby preventing piston 58 from moving spool valve member 22 downward. Under these conditions, seal 48 effectively blocks flow across the valve. Should the outlet pressure in annulus 36 decrease, this change will be sensed as a lowered pressure in chamber 32 which permits spool valve member 22 to move downwardly under the force of spring 34 as shown in FIG. 3. As the orifices 28 contact the groove 66, the high gas pressure from the chamber 24 will be communicated to the face of the sealing ring 68 which tends to force it and the O-ring 64 back into the groove and away from the chamfered edges of the orifices 28. This effectively prevents the O-ring 64 or the sealing ring 68 from being displaced outwardly of the groove which would make either or both sealing members vulnerable to displacement and nibbling by the edges of the metering orifices 28. Further downward movement of the spool valve member 22 results in orifices 22 again being blocked against the wall of bore 20 since this length of bore 20, although short, is longer than the diameters of the chamfers. Thus there is no bridging of this short length of bore by the chamfered openings. Additional downward movement of spool valve member 22 results in high pressure gas being vented through orifices 28 into annular chamber 50 and, at the same time, permits flow between chamber 50 and the inside edges of the disks in stack 46. This permits flow across the stack through a series of serpentine pathways which include a series of chambers and interconnecting pressure-reducing orifices which serve to quiet operation of the valve. This additional flow will, of course, tend to raise the gas pressure in the outlet annulus 36, which increase will be sensed as an increased pressure in chamber 32. As this pressure increases, piston 58 will be forced upwardly and spool valve member 22, under the force of spring 42, will follow, until orifices 28 are again blocked.

While the invention has been described herein in terms of a specific type of pressure reducing valve, the teachings herein are obviously applicable to other valve configurations such as spool type servo valves which direct high pressure fluid flow to one of two ports to control the position of a piston in a cylinder. Those skilled in the art will think of a number of valve configurations including a spool valve member wherein pressure differentials tend to drive an O-ring or sealing ring out of its groove and cause it to be damaged and worn out prematurely and wherein the present invention could be usefully employed.

I claim:

1. A spool valve and seal therefor having zero leakage comprising:
    a valve body having a fluid inlet port and a fluid outlet port and including means defining a bore having axially spaced inlet and outlet passages;
    a spool valve member reciprocally mounted in said bore, said spool valve member being shiftable between first and second positions respectively wherein in said first position flow is prevented between said inlet and outlet passages and wherein in said second position flow is metered between said inlet and outlet passages;
    characterized in that said spool valve member includes an internal chamber, a plurality of radial ports through the wall of said spool valve member connecting said inlet passage with said internal chamber, a plurality of radial metering orifices of area substantially smaller than the area of said radial ports through the wall of said spool valve member axially displaced from said radial ports and communicating with said outlet passage when said spool valve member is moved to said second position, said metering orifices being cylindrical and chamfered at the exterior surface of said spool;
    and seal means for preventing leakage between said inlet and outlet passages when said spool valve member is in said first position, said seal means including an annular groove in the wall of said bore and an O-ring with a low friction sealing ring in said annular groove adjacent said spool valve member, said annular groove being displaced along said bore toward said inlet passage from said outlet passage by a distance greater than the diameter of the chamfered outlets of said radial metering orifices.

2. A spool valve and seal as set forth in claim 1, wherein the diameter of the chamfered outlets of said radial orifices is less than the axial width of said low friction sealing ring.

3. A spool valve and seal as set forth in claim 1 wherein said spool valve member includes a land adjacent said bore containing said radial metering orifices, said land being axially located such that when said spool is in said first position fluid flow between said inlet and outlet passages is blocked and when in said second position fluid flows through said radial orifices to said outlet passage,
    a plurality of stacked disks having openings which cooperate to define a number of finely divided serpentine paths are positioned in said valve body downstream of said outlet passage, and movement of said spool valve member to said second position opens communication between said outlet passage and said stacked disks such that fluid must flow from said outlet passage through said serpentine paths to said outlet port.

4. A spool valve and seal as set forth in claim 3 wherein said valve body includes a first chamber, movable wall means in said chamber and conduit means communicating said fluid outlet port with said movable wall means in said chamber and resilient means in said chamber urging said movable wall means against said spool valve member to urge said member toward said second position against the force of the pressure at said fluid outlet port.

5. A spool valve and seal as set forth in claim 3 wherein the axial length of said low friction sealing ring is greater than the diameter of the chamfered outlets of said radial metering orifices.

* * * * *